(12) United States Patent
Šulc

(10) Patent No.: US 9,336,676 B2
(45) Date of Patent: May 10, 2016

(54) ELECTRONIC TRANSCEIVER MODULE FOR NETWORK WIRELESS COMMUNICATION IN ELECTRIC OR ELECTRONIC DEVICES OR SYSTEMS, A METHOD OF CONTROLLING IT AND A METHOD OF CREATING A GENERIC NETWORK COMMUNICATION PLATFORM WITH TRANSCEIVERS

(75) Inventor: Vladimír Šulc, Sobotka (CZ)

(73) Assignee: MICRORISC S.R.O., Jicin (CZ)

( * ) Notice: Subject to any disclaimer, the term of this patent is extended or adjusted under 35 U.S.C. 154(b) by 2148 days.

(21) Appl. No.: 12/155,224

(22) Filed: May 30, 2008

(65) Prior Publication Data

US 2009/0156141 A1    Jun. 18, 2009

(30) Foreign Application Priority Data

Dec. 12, 2007 (CZ) .............................. PV 2007-873

(51) Int. Cl.
    *H04B 1/40* (2015.01)
    *G08C 17/02* (2006.01)
    *H04W 48/18* (2009.01)

(52) U.S. Cl.
    CPC  *G08C 17/02* (2013.01); *H04B 1/40* (2013.01); *H04W 48/18* (2013.01)

(58) Field of Classification Search
    USPC ............. 455/90.1, 82, 552.1, 553.1; 370/328, 370/329
    See application file for complete search history.

(56) References Cited

U.S. PATENT DOCUMENTS

| | | | |
|---|---|---|---|
| 5,610,910 A * | 3/1997 | Focsaneanu et al. | 370/351 |
| 6,108,614 A | 8/2000 | Lincoln et al. | |
| 6,275,166 B1 | 8/2001 | del Castillo et al. | |
| 6,297,746 B1 | 10/2001 | Nakazawa et al. | |
| 6,687,487 B1 | 2/2004 | Mosebrook et al. | |
| 6,879,806 B2 | 4/2005 | Shorty | |
| 6,980,080 B2 | 12/2005 | Christensen et al. | |
| 2005/0102374 A1 * | 5/2005 | Moragne et al. | 709/217 |
| 2005/0190778 A1 * | 9/2005 | Ozluturk | 370/406 |
| 2005/0282494 A1 * | 12/2005 | Kossi et al. | 455/41.2 |
| 2006/0112192 A1 * | 5/2006 | Stewart et al. | 709/249 |
| 2007/0178933 A1 * | 8/2007 | Nelson | 455/550.1 |
| 2008/0107034 A1 * | 5/2008 | Jetcheva et al. | 370/238 |
| 2008/0108321 A1 * | 5/2008 | Taaghol et al. | 455/410 |
| 2008/0181171 A1 * | 7/2008 | Koziy et al. | 370/328 |
| 2009/0063193 A1 * | 3/2009 | Barton et al. | 705/3 |
| 2009/0103481 A1 * | 4/2009 | Mahajan et al. | 370/329 |
| 2009/0303935 A1 * | 12/2009 | Ozluturk | 370/328 |
| 2009/0310488 A1 * | 12/2009 | Mighani et al. | 370/235 |

* cited by examiner

*Primary Examiner* — Nay A Maung
*Assistant Examiner* — Erica Fleming-Hall
(74) *Attorney, Agent, or Firm* — Buchanan Ingersoll & Rooney PC

(57) ABSTRACT

An electronic transceiver module and method for controlling the electronic transceiver module for network wireless communication in electric and/or electronic devices or systems in high frequency bands up to 10 GHz, including a device for wireless communication connected to an antenna entry, a control device, and a memory device. The control device is connected to the memory device, to the device for wireless communication and to a comparator block, which is further connected to the memory device. The memory device includes at least two separate memories for storing information identifying various wireless networks.

6 Claims, 3 Drawing Sheets

ELECTRONIC TRANSCEIVER MODULE FOR NETWORK WIRELESS COMMUNICATION IN ELECTRIC OR ELECTRONIC DEVICES OR SYSTEMS, A METHOD OF CONTROLLING IT AND A METHOD OF CREATING A GENERIC NETWORK COMMUNICATION PLATFORM WITH TRANSCEIVERS

Electronic transceiver module for network wireless communication in electric or electronic devices or systems, a method of controlling it and a method of creating a generic network communication platform with transceivers.

FIELD OF THE INVENTION

The present invention involves the arrangement of an electronic module for network wireless communication in electric or electronic devices or systems, in high frequency bands in the range, for example, of 300 MHz to 10 GHz, particularly for home and office automation systems and for remote metering. The invention also involves a method of controlling the module and a method of creating a generic network communication platform permitting wireless communication by other electric or electronic devices by means of those transceiver modules.

DESCRIPTION OF THE PRIOR ART

In the field of less expensive communication devices and modules suitable for wireless communication in home and office automation systems, there are available at the present time receiver modules, transmitter modules, transceiver modules, or modules with specialized e.g. control functions. The majority of these devices operate in transmitter-receiver pairs. Communication between more points is generally very limited and is based on the manufacturers' proprietary reports.

For more demanding applications, standards were created suitable for communication in more devices, that is for network communication. This involves, for example, Wi-Fi, Bluetooth or ZigBee, for which specialized circuits or modules are created, the higher price corresponding to the complexity of these solutions and standards. Such solutions generally comprise a so-called software stack, that is a file of routines ensuring complete operation according to a defined protocol or standard and implemented on the appropriate hardware. The complexity and exacting requirements of these solutions in terms of the hardware used do not facilitate their installation in less demanding systems, for example in home and office automation environments. The devices commonly available on the market are also generally very energy intensive in operation. There is therefore no general concept on the market of a generic network communication platform for the construction of inexpensive and energy saving devices ensuring wireless connectivity suitable for home and office automation and/or for the area of remote metering, in other words for less expensive systems with lower transmitting speeds and with a smaller volume of data to be transmitted, making it possible to add inexpensive wireless network connectivity to standard electronic or electric devices and facilitating fast and effective development of user applications.

SUMMARY OF THE INVENTION

The subject of the invention is an electronic transceiver module for network wireless communication in electric and/or electronic devices or systems in high frequency bands up to 10 GHz, comprising a block for wireless communication connected to an antenna entry, and further comprising a control block and memory block. The basis of the invention lies in the fact that the control block is connected to a memory block, to a block for wireless communication and to a comparator block which is further connected to a memory block comprising at least two separate memories for storing information identifying various wireless networks. The memories for storing identifying information for the wireless networks can be arranged in a single memory block or, alternatively, they can be incorporated, together with the comparator block and the control block, in the control block of a micro-controller.

The topology of the transceiver module is such that it can be used to construct a generic network communication platform based on simultaneous connection to more wireless networks, being at the same time inexpensive, simple to implement (modular arrangement) and allowing for very fast development of new applications. If the memory blocks with identifying information for various networks and/or a comparator are integrated in the control block, the solution is even simpler and less expensive, since these blocks can be implemented, for example, by means of the internal memory of the control block and/or by the virtual programming means of the control block. The module can also comprise an integrated antenna, the antenna interface being an internal interface between the antenna and the block for wireless communication and/or the power source. The advantage lies in the high degree of integration, an external power source is not necessary. In an alternative embodiment, the transceiver module can comprise blocks for measuring physical quantities, for example a temperature gauge connected through an interface to the control block. Besides a higher degree of integration, the main advantage lies in the possibility of creating a complete application communicating in a wireless network, a solution which is particularly suited to remote metering.

The invention further involves a method of controlling said electronic transceiver module into which a high frequency signal is fed, which is then converted into a sequence of binary data. The basis of the method lies in the fact that the parts of this sequence of binary data carrying identification of the wireless network of the receiving signal are compared with the network identification stored in the individual memories of the transceiver and, on the basis of this comparison and an assessment of the identifying information, the transceiver module switches over into the relevant wireless networks. In the transmitting operational mode in the transceiver, identifying data is read from the relevant memory according to the network designated for transmission, that identifying information is entered into a sequence of binary data which is then converted into a high frequency signal and emitted into the surrounding space.

Simultaneously with the switching over of the transceiver module into the various wireless networks, its function, which is operated by the module in the relevant network, switches into either the Master device or Slave device mode. Depending upon its program code, the control block can switch the module into two basic modes, that is the Master mode in which the module is the controlling element of the cluster, and the Slave mode in which the module is controlled by another Master device in that cluster. It involves a control method that can be used to construct a wireless network topology, whilst the simultaneous connection to several wireless networks allows for the division of bigger wireless network topologies into smaller units (clusters) in which it is much easier to ensure the network service of addressed of the message (packet) delivery and to reduce the time and consequently the energy requirements for their delivery whilst maintaining the possibility, thanks to the simultaneous connection of the device to various clusters, of connecting these clusters or linking them up where there is a need to construct bigger network topologies.

The invention further involves a method of creating and controlling a generic network communication platform with transceivers, where at least some transceivers work simultaneously in more than one MESH wireless network, thereby facilitating the connection of those networks and the transfer of information between them. A transceiver module switched into the Coordinator (Master device) mode controls the relevant cluster, whilst acting as a controlled device in the other cluster, thereby permitting the creation of a hierarchic wireless network topology composed of smaller networks (clusters). Alternatively, the transceiver module always works in the Slave mode in various clusters, thereby permitting those modules to be used for easier construction of wireless network topologies by chaining clusters on the same level.

The two methods of connecting the various clusters, that is in a hierarchic tree structure of clusters and by chaining the clusters, can be combined.

The invention can also be used for more effective development of wireless applications, for ensuring wireless communication in electric or electronic devices and other devices connected to them, as for example elements of heating systems, security systems or lights. The transceiver modules are designed primarily for use as nodes in MESH networks and to construct effective networks of wireless topology for equipment requiring wireless network connectivity. The invention can be used to advantage primarily in home and office automation applications, in measuring systems, in data collection systems and everywhere where the use of cables or other direct connections for transfer of data is inefficient and where, for reasons of cost or complexity, it is not possible to use technologies such as ZigBee, WiFi or Bluetooth.

BRIEF DESCRIPTION OF THE DRAWINGS

A more detailed description of the invention is provided by means of the attached drawings and the following description of examples of the preferred embodiments.

EXAMPLES OF PREFERRED EMBODIMENTS

Figure 1:
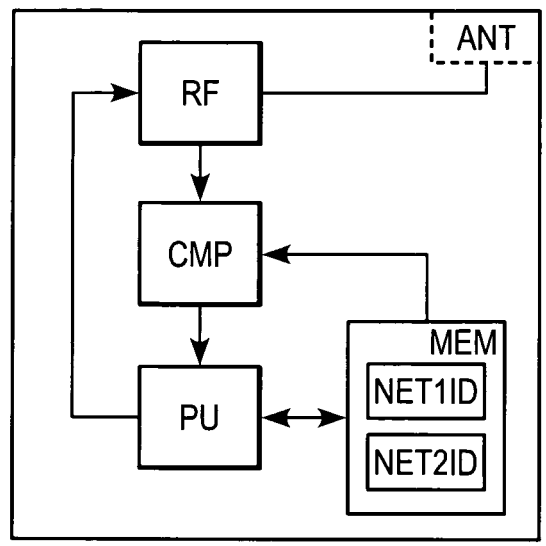
FIG. 1 is a schematic illustration of the basic structure of an electronic transceiver module.
Figure 2:
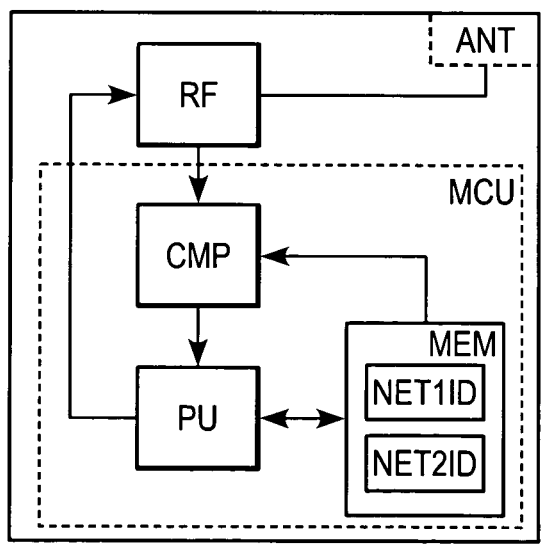
FIG. 2 shows an alternative embodiment where, for reasons of simplicity and cost, the memory, comparator and module control block are incorporated into a single control block, that is into a micro-controller.

The electronic transceiver module for network wireless communication in electric or electronic devices or systems in high frequency bands of approximately 300 Mhz to 10 GHz, comprises a block RF for wireless communication connected to an antenna entry ANT, and further comprises a control block PU and a memory block MEM. The control block PU is connected to a memory block MEM, to a block RF for wireless communication and to a comparator block CMP. The comparator block CMP is further connected to a memory block MEM comprising, in this case, two separate memories NET1ID, NET2ID for storing information identifying the various wireless networks. The memories NET1ID, NET2ID for storing the identifying information for the wireless networks can be arranged in a single memory block and can also be incorporated, together with the comparator block CMP and the control block PU, in a single micro-controller MCU.

A high frequency signal from the antenna entry ANT is fed into the block RF for wireless communication in which it is then converted into a sequence of binary data, which is then taken to the entry to the comparator block CMP. In the comparator block CMP, the parts of this sequence carrying network identification are compared with the network identification stored in the memory NET1ID and with the network identification stored in the memory NET2ID. The results of the comparison, that is information on the relevance to the NET1 and/or NET2 networks, is taken from the outlet of the comparator block CMP to the entry to the control block PU, which then decides on the further processing of the data.

For the ordered sequence of binary data used in network communication the term "packet" is also used, and for a packet destined for a specific device the term "addressed packet" is used. Because the transceiver module comprises both a transmitting part and a receiving part, it can work in two basic modes—transmitting and receiving. In the transmitting mode the control program in the control block PU reads the identification of the required network (cluster) to which the transceiver module is assigned, in such a way that identification of the module in the relevant network is read from the relevant memory NET1ID/NET2ID, and that identification is then inserted into the addressed packet together with the further information needed. The packet is then transferred to the entry to the block RF for wireless communication in which it is converted into a high frequency signal, then by means of the antenna interface or the antenna entry ANT it is fed into the antenna and from there emitted into the surrounding space. In the transmitting mode the control block PU determines for which network the report is destined by adding the identification of the relevant network to the report. In the receiving mode, the module is automatically adjusted to the relevant network after receipt of the report and after successful comparison of the identifying information from the report with the identifying information stored in one of the network identification memories.

In the receiving mode the high frequency signal from the antenna entry ANT is brought into the block RF for wireless communication in which it is then converted into a sequence of binary data, which is then brought to the entry to the comparator block CMP. In the comparator block CMP, the parts of the sequence bearing the network identification are compared with the network identification stored in the memory NET1ID and with the network identification stored in the memory NET2ID. The results of the comparison, that is information concerning relevance to the networks NET1 and/or NET2, is taken from the outlet of the comparator block CMP to the entry of the control block PU, which then decides on the further processing or elimination of the packet.

Individual devices can communicate together by means of their mutual connection. Depending upon the method of connecting and communicating, individual methods of network configuration (hereinafter network topology) and mutual communication are divided into non-network and network.

Wireless communication in the high frequency field, based on simultaneous sharing of the high frequency band, permits the creation of a network topology by inserting direction and address information into the packet so that the addressee is not determined by a physical connection, but by processing the address information stored in the packet. For wireless network connection of electric and electronic devices for remote metering and for the area of home automation, it is practical to use wireless communication topology of the STAR and MESH types. The configuration of the wireless network into a star (STAR type network), where the controlling device communicates with the other devices, can be successfully used for connecting devices which are in its direct signal range, for example for automation of smaller buildings or for balloting systems. For bigger establishments, however, more transmission power is needed in order to extend the range. By increasing the transmission power, energy consumption by the device is increased during communication, which for some applications can be limiting. In composite buildings with barriers which limit the broadcasting of the high frequency signal in certain directions, it is not possible to ensure the transmission of the signal even with a substantial increase in transmission power, since the STAR network arrangement is not suitable for such cases.

For many applications therefore, the best solution appears to be individual devices organized into a MESH network. The devices can also work as routers, packets are delivered not only by the device in the direct range of the high frequency signal, but also by routing across several other devices. The MESH network arrangement is therefore suitable for use in remote metering and for automation of buildings. The disadvantage lies in the implementation demands for control of this network topology, particularly for a network consisting of many devices. The implementation demands, that is the method of performing the network services (routing, preventing collision, searching the network) and the further demands on the hardware used, is proportional to the number of devices connected in the network, since with each additional device the number of possible combinations of addresses and routings increases.

The electronic transceiver module and the method of controlling the network topology according to the present invention makes it possible to substantially simplify the implementation demands of wireless MESH networks, whilst at the same time preserving the network topology. That topology is expandable, the number of devices communicating in one cluster being limited so that the disadvantage of a smaller number of devices in one cluster is not a limiting factor, because individual clusters can be connected by means of transceiver modules which can be part of two or more clusters.

In the specific embodiment of this invention, the MESH network is created by means of transceiver modules where, in order to address an interior cluster, just the double-byte identification of the cluster is used and the one-byte logical address added to the device during the matching process. The user can chose the method of routing, which permits use of up to 16 directional jumps. Besides a significant extension of the range, extended by each jump, there is a fundamental increase in reliability of delivery of the packets, since each packet can be delivered by several different routes so that, even in the event of a power failure in some devices, the packet can be delivered to the addressee. For identification of the cluster a four-byte identifying number is used, which is part of the single identifying number of the control module (the coordinator of the cluster). The fact that the module can work in more than one network facilitates practical control for example of data collection from electrical meters or water meters in multi-story buildings.

Example 1

Figure 3:
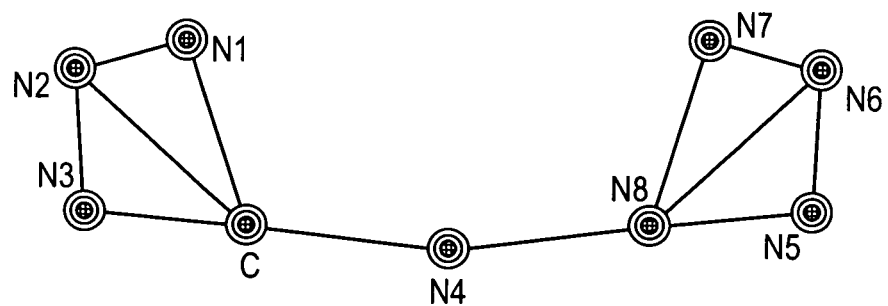
FIG. 3 shows a MESH-type wireless network comprising one control element and eight other devices. For unique addressing of each of those eight individual devices, the length of the address must be at least three bits.
Figure 4:
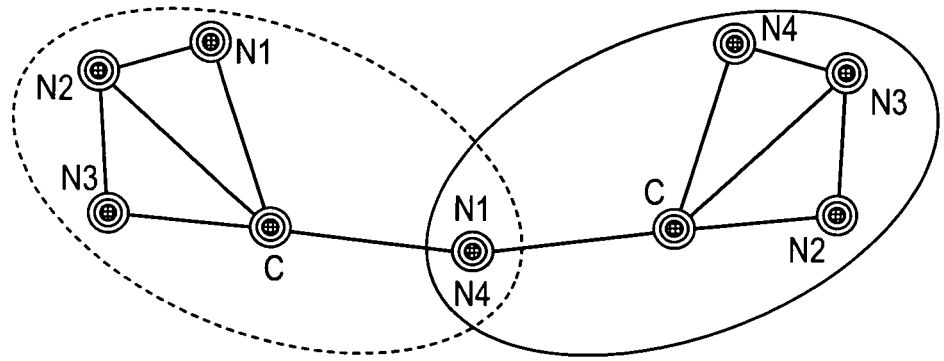
FIG. 4 shows a MESH-type wireless network which is divided into two smaller networks, where each of the smaller networks has its own control element and four individual devices belonging to each of those networks. For unique addressing, it is sufficient that the length of the address be only two bits.

FIG. 3 shows a MESH network comprising one controlling element (marked C) and eight other devices (marked N1 to N8). For unique addressing of the eight individual devices, the length of the address must be at least three bits. FIG. 4 shows a MESH network divided into two smaller networks, so that each of the smaller networks has its own control element (C, C') and four individual devices belonging to each of those networks (N1 to N4; N1' to N4'). For unique addressing, it is sufficient that the length of the address be only two bits. The advantages of dividing a network into smaller sub-networks are as follows:

Shorter address, therefore less demand on the memory where identification of individual devices must be stored, and also smaller size of addressed packets;

Smaller number of routing jumps, therefore less demand for complicated routing and also shorter delivery time and correspondingly lower energy consumption (individual devices are in an active state for a shorter time);

Above all, substantial simplification of network service operation, since the number of possible combinations is significantly lower.

An example of the convenience of such a division into smaller sub-networks can be, for example, a method of zoning space heating control, where individual radiators (Nx) in a given area are governed by a control panel in that area. Individual radiators primarily communicate with the relevant control panel and can sometimes receive an instruction from a superordinate computer connected to some of the nodes, because the possibility of their connection is preserved. It is not necessary that everything be controlled from a single place and there is therefore a substantial reduction in operational demands and, thanks to the shortened delivery time for the packets, there is also lower energy consumption.

Example 2

Figure 5:
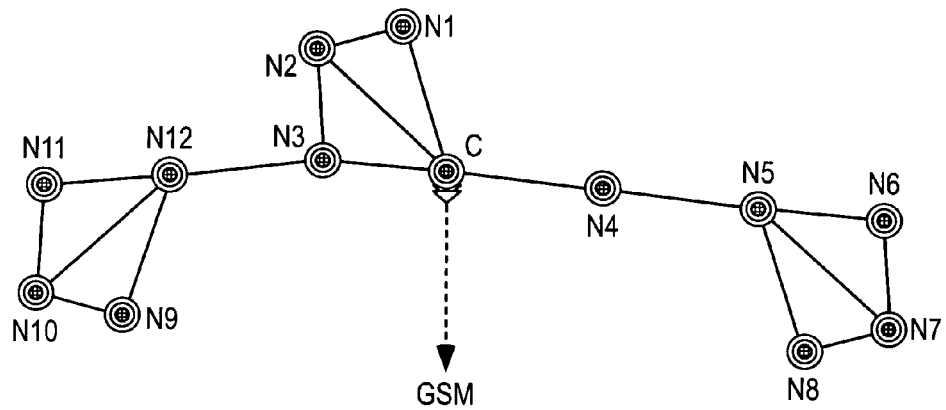
FIG. 5 shows the conventional structure of a MESH type wireless network where remote devices in the network must send packets across the appropriate nodes thereby multiplying the time needed for transfer, which is reflected primarily in a substantial increase in energy consumption by the devices through which the packets are directed. In other words, those devices must spend more time receiving and handling the direction of the packets.
Figure 6:
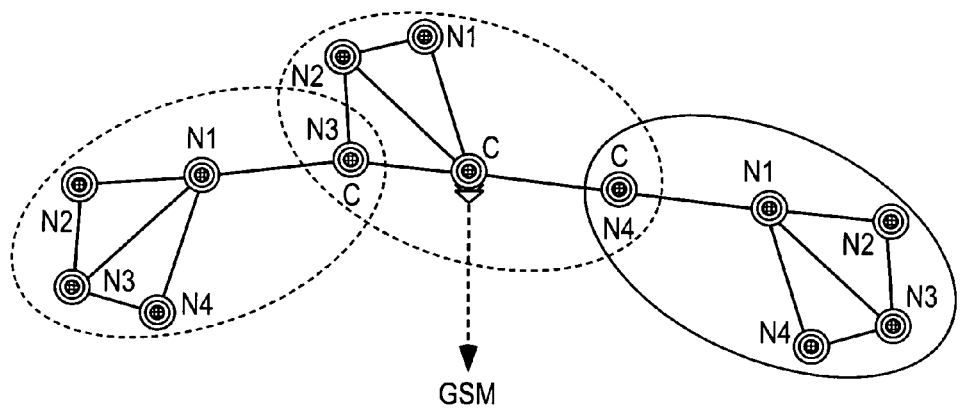
FIG. 6 shows, for comparison, the structure depicted in FIG. 5 with the application of the present invention, where a larger network is divided into several smaller hierarchical networks. The operational demands are substantially reduced here, the shared equipment is a coordinator in the controlled clusters, in the controlling cluster it acts as a device controlled by its coordinator.

It is obvious from a comparison of FIGS. 5 and 6 that there is a basic reduction in operational demands where a bigger MESH network is divided into several smaller hierarchical MESH networks (the middle cluster is a control cluster, the left and right are controlled clusters). FIG. 5 shows a network with a single coordinator or control element C and twelve devices N1 to N12, for example heating radiators. In this case, the devices (N9, N10, N11, N6, N8, N7) at a distance from the control element C would have to send packets through the relevant nodes (N2, N3, N5, N4). But that multiplies the time required for the transfer, which is reflected particularly in a substantial increase in energy consumption by the devices through which the packets are directed, because more time is required for receiving and attending to this routing.

After dividing the network into smaller networks, as shown in FIG. 6, the shared device in controlled clusters is the coordinator or control element C', C'', in the control cluster it acts as a device controlled by its control element C. An example of the convenience of such a solution can be seen in data collection from water meters in multi-story buildings where, for example, water meters from certain floors (N1 to N4, N1' to N4', N1'' to N4'') are read and the measured data are sent to the relevant control device on the floor, so that the overall data from one floor (water meters N1' to N4') and from other floors (water meters N1'' to N4'') are sent altogether from the devices (C'-N3 and C''-N4) to the main control element C and are subsequently sent, for example, through a GSM gate to the central office.

Using the transceiver modules according to the present invention, a MESH network can easily be implemented by means of the many built-in functions of the operational system for management of the networks, for example switching them over, matching the devices, directing or switching the modules over into the Coordinator (in the topology marked C—controlling element or controlling device) or Node (controlled device) mode. The size of the cluster in that case is limited to 239 controlled devices for which a one-byte number is sufficient for the single address. In order to address an interior cluster, just the double-byte identification of the cluster is used and the one-byte logical address added to the addressed device during the matching process. The user can chose the method of routing, which permits use of up to 16 directional jumps. Besides a significant extension of the range, extended by each jump, there is a fundamental increase in reliability of delivery of the packets, since each packet can be delivered by several different routes so that, even in the event of a power failure in some devices, the packet can be delivered to the addressee. For identification of the cluster a four-byte identifying number is used, which is part of the single identifying number of the control module (the coordinator C of the cluster). The fact that the module can work in more than one network makes possible very simple handling, for example, of data collection from electrical meters or water meters in multi-story buildings, as can be seen in FIG. 6.

INDUSTRIAL USE

The invention can be used for network wireless communication in electrically or electronically controlled devices or systems, in high frequency bands in the range of 300 MHz to 10 GHz, and particularly for building low-cost modular network communication platforms suitable particularly in the field of home and office automation, for use in the automobile industry and for remote metering, in data collection systems and everywhere where the use of cables or other direct connections for the transfer of data is ineffective and where, for reasons of cost and complexity, it is not possible to use technologies such as ZigBee, WiFi or Bluetooth. The invention can be used for devices such as elements of heating systems, safety systems or lighting. The electronic transceiver modules are intended primarily for use as nodes in MESH networks and for building effective network wireless topologies for devices requiring wireless network connectivity.

The invention claimed is:

1. A method of creating and controlling a generic network communication platform with devices for network wireless communication in electric and/or electronic equipment or systems in high frequency bands up to 10 GHz, wherein at least two of the devices each respectively comprise:

a communication interface for wireless communication connected to an antenna entry;
a control block; and
a memory unit,
wherein the control block is connected to the memory unit, to the communication interface for wireless communication and to a comparator unit, which is further connected to the memory unit, and
wherein the memory unit comprises at least two separate memories for storing information identifying various wireless networks,
wherein the method comprises:
operating at least some of the devices to work simultaneously in more than one of a plurality of wireless networks to facilitate the connection of the networks and the transfer of information between the networks;
controlling at least one of the devices into which a high frequency signal is fed;
converting the high frequency signal into a sequence of binary data;
comparing parts of the sequence of binary data carrying identification of the wireless network of the received high frequency signal with network identification respectively stored in the separate memories comprised in the memory unit of the at least one of the devices; and
switching the at least one of the devices over into a relevant wireless network based on the comparison and an assessment of the identifying information, and
wherein, in a transmitting operational mode in the at least one of the devices, the method comprises:
reading identifying data from a relevant one of the memories according to a network designated for transmission;
entering the read identifying information into a sequence of binary data; converting the sequence of binary data into a high frequency signal; and
emitting the high frequency signal into an environment surrounding the at least one of the devices.

2. A method of creating a generic network communication platform according to claim 1, wherein individual wireless network clusters are at least one of linked up and hierarchically arranged.

3. A method of creating a generic network communication platform according to claim 1, wherein the memories of at least one of the devices for storing identifying information for the wireless networks are arranged in a single memory unit.

4. A method of creating a generic network communication platform according to claim 1, wherein the memories of at least one of the devices for storing identifying information about the wireless networks are incorporated, together with the comparator unit and the control block, in a micro-controller.

5. A method of creating a generic network communication platform according to claim 1, comprising:
simultaneously with the switching over of the at least one of the devices into the various wireless networks, switching a function of the at least one of the devices, which is operated by the control block in the relevant network, into one of a Master device mode and a Slave device mode.

6. A method of creating a generic network communication platform according to claim 1,
wherein at least one of the plurality of wireless networks is a MESH network.

* * * * *